July 28, 1942. J. P. JOHNSON 2,291,229

FLUID METERING DEVICE

Filed April 25, 1940

INVENTOR.
JAMES P. JOHNSON
BY
O. Melbourne Green
ATTORNEY.

Patented July 28, 1942

2,291,229

UNITED STATES PATENT OFFICE 2,291,229

FLUID METERING DEVICE

James P. Johnson, Shaker Heights, Ohio

Application April 25, 1940, Serial No. 331,585

11 Claims. (Cl. 137—166)

This invention relates to a fluid metering device capable of handling an introduced fluid at varying pressures and effecting its discharge at a plurality of points in quantities which bear a constant ratio one with another regardless of the pressure of the introduced fluid.

The metering device as designed is especially useful in connection with the operation of retractible landing gears, and like mechanisms, where simultaneous and uniform operation is essential. Heretofore, in hydraulically actuated mechanisms of this type oil from a single source was supplied to a pair of such mechanisms for simultaneous operation. If one mechanism operates more freely than the other it will be seen that the one will operate ahead of the other, which condition, especially in retractible landing gears, is of serious consequence. It is therefore, an object of the present invention to provide a fluid metering device adapted to receive a fluid under various pressures from a single source and to discharge the same in equal or different quantities at a plurality of points whereby the mechanisms connected to the respective outlets are operated simultaneously and uniformly regardless of the differences in pressures required to actuate the different mechanisms.

Another object of the present invention is to provide a compensating means actuated by the relative differences in pressures required for simultaneous operation of the mechanisms whereby only that volume of fluid required for individual operation is permitted to flow in relative proportions.

Another object of the present invention is to provide means for relatively varying the volume of fluid transmitted to each mechanism automatically and actuated by pressure differences in the fluid outlet lines.

Another object of the present invention is to provide means for adjusting the means for relatively varying the volume of fluid whereby a predetermined relation may be effected to adapt the metering device for different conditions.

Another object of the present invention is to provide a metering device which is simple in construction and assembly, efficient in operation, and inexpensive to manufacture.

With the objects above indicated, and other objects hereinafter explained in view, my invention consists in the construction and combination of elements hereinafter described and claimed.

Referring to the drawing.

Figure 1:
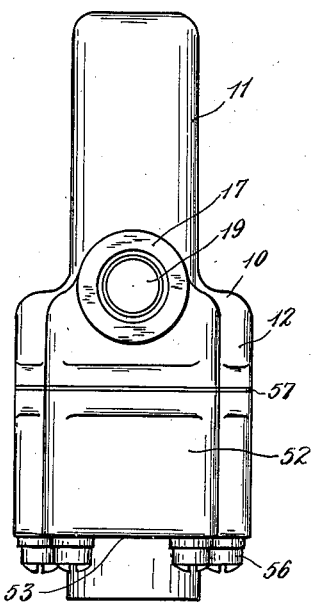
Figure 1 is an end elevational view of the metering device embodying the present invention.

In the drawing I have illustrated a metering device of preferred construction embodying the present invention but it should be understood that the invention is not so restricted and it may be otherwise adapted by those skilled in the art. As illustrated in the accompanying drawing, the metering device comprises a housing 10, preferably made of aluminum or other suitable light weight material, which is closed at its outer end but open at its inner end. The housing 10 includes an outwardly extending centrally disposed portion 11 preferably elongated in transverse section as more clearly shown in Figure 5, and an integral relatively enlarged outwardly extending marginal disposed portion 12, the outer face 13 of which provides an attaching flange for a purpose to be later described. The housing 10 is provided with a pair of bores 14 and 15 of suitable diameter which extend inwardly from the face 13 and are disposed relatively with their longitudinal axes in parallel spaced relation. The bores 14 and 15 each terminate inwardly from the closed end of the extension 11 as more clearly shown in Figure 2 and the extension is provided with a connecting passageway 16 of relatively small diameter affording communication between the respective bores for a purpose to be later described. The housing 10 is provided, adjacent its inner end, with a pair of laterally extending projections 17 and 18 having internally tapped openings 19 and 20 respectively the inner ends of which communicate with annular passageways 21 and 22 formed on the inside of the housing and disposed in encircling relation with respect to the adjacent bores. These tapped openings 19 and 20 are adapted for suitable connection with a pair of mechanisms whose simultaneous and uniform operation are desired in a manner which will be later more fully described, and while only two of such openings are here illustrated it should be understood that any number may be employed with slight modifications.

Figure 2:
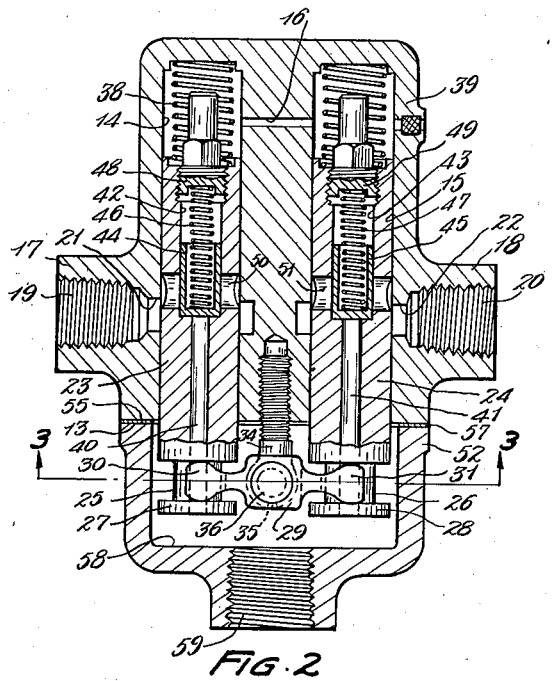
Figure 2 is a longitudinal vertical sectional view taken substantially along the line 2—2 in Figure 3 and showing details of the metering device.
Figure 3:
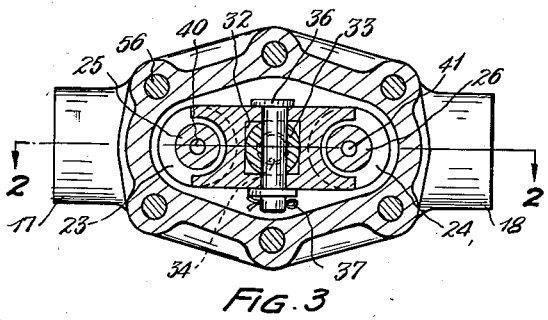
Figure 3 is a transverse sectional view taken along lines 3—3 in Figure 2 and showing further details of the invention.

A pair of cylinders 23 and 24, of identical construction, are slidably mounted in the respective bores 14 and 15 and have their inner ends in spaced relation with respect to the bottom of the bores and outer portions projecting a substantial distance beyond the face 13 of the housing as more clearly shown in Figure 2. The outer ends of the cylinders 23 and 24 are provided with portions 25 and 26 of reduced diameter thus providing laterally extending flanges 27 and 28 at their outer ends. In the operation of the present device it is essential that the cylinders 23 and 24 move in opposite relative directions and to effect such movement a link 29 is provided which has a pair of bifurcated projections 30 and 31 disposed on diametrically opposite sides in encircling relation with the adjacent reduced portions 25 and 26 and between the flanges and adjacent ends of the cylinders as more clearly shown in Figure 3. The link 29 has a central opening 32 to receive the outer end 33 of an adjustable member 34 screwthreadedly mounted in the adjacent inner end of the housing and a screwdriver slot 35 is provided in the outer end 33 by means of which the adjustable member may be predeterminedly positioned. The link 29 and the end 33 of the adjustable member are provided with aligned openings through which a headed pin 36 extends and is prevented from accidental disengagement by a cotter pin 37 mounted on the outer free end of the pin. It will be noted that inasmuch as the link 29 is pivotally mounted at its mid-portion about the end 33 of the adjustable member the bifurcated projections 30 and 31 move in opposite directions about the pivot and thus, being operatively connected with different cylinders, effects a positive movement of the latter in their direction of movement. The cylinders 23 and 24 however are kept in proper alignment by the walls of the bores in which they are slidably mounted.

Disposed at the inner ends of the bores 14 and 15 are coiled springs 38 and 39 having identical characteristics, the inner end of the springs being disposed in abutment with the bottoms of the bores while the outer ends of the springs are in abutment with the inner ends of the cylinders. These springs are preferably of the same tension and are employed to exert an outward force on each cylinder so as to maintain them in balanced relation but the load should be relatively small. The cylinders 23 and 24 are provided with centrally disposed passageways 40 and 41 of relatively small diameter extending inwardly a substantial distance from the outer ends of the cylinders as more clearly shown in Figure 2. The passageways 40 and 41 communicate with centrally disposed openings 42 and 43 of relatively larger diameter extending inwardly from the inner ends of the cylinders and a pair of tubular valve members 44 and 45, having closed inner ends, are slidably mounted within the openings 42 and 43, the closed ends being adapted for interrupting communication between the passageways 40 and 42, and the passageways 41 and 43. Coiled springs 46 and 47 of identical characteristics are disposed centrally within the openings 42 and 43 and have their inner ends in abutment with the closed ends of the valve members 44 and 45. The outer ends of the springs are in abutment with plugs 48 and 49 screwthreadedly mounted in the outer ends of the openings 42 and 43 and by axial adjustment of the plugs the springs may be desirably tensioned. Here again the load of the springs should be relatively small and are employed for yieldably urging the valve members toward their seats.

In order that the passageways 40 and 41 in the cylinders may be placed in communication with the outlet openings 19 and 20 respectively, the cylinders are provided with transverse openings 50 and 51 respectively, which extend entirely through the body of the cylinders and are positioned for relative alignment with the annular passageways 21 and 22. In Figure 2 these transverse openings 50 and 51 are shown positioned considerably inwardly with respect to the annular passageways 21 and 22 and this relationship is effected by the position of the adjusting member 34. The relationship of these transverse openings 50 and 51 and annular passageways 21 and 22 will be predetermined by the relative characteristics of the fluid actuated mechanisms and when once adjusted for a particular condition will need no further attention. It will be obvious that the cylinders may be moved outwardly axially by removing the pivot pin 36 and inserting a screw-driver in the slot 35 in the adjustable member 34 and by turning the member in the proper direction it will cause the link 29 to move outwardly and in turn move the cylinders until the proper relationship is effected between the transverse openings and the annular passageways after which the pin is reinserted and the device functions as heretofore described. It will also be observed that the movement of the cylinders in opposite directions brings one of the transverse openings more into alignment with one annular passageway and the other more out of alignment, thus permitting a greater quantity of fluid to pass through one outlet opening than the other. By reason of the link connection this relationship of discharged fluid is maintained in a definite ratio.

A cover member 52, preferably of aluminum or other suitable light weight material, has an outer end wall 53 and a laterally disposed marginal flange 54 the inner face 55 being of the same general contour as the face 13 on the housing to which it is detachably connected by screws 56. A gasket 57 is disposed between the adjacent faces 13 and 55 to provide a fluid tight seal therebetween. The cover member encloses the outer adjacent ends of the cylinder 23 and 24 and is suitably spaced to provide a fluid chamber 58 on the inside of the cover member as more clearly shown in Figure 2. The end wall 53 of the cover member 51 has a tapped opening 59 in communication with the chamber 58 and the opening is adapted for communication with a suitable source of fluid under pressure. Usually the source of fluid is the well known high pressure type of hydraulic pump from which fluid, usually oil, is discharged under high pressure which pressure varies considerably. Heretofore this discharged fluid was connected directly with the mechanisms to be actuated and if the mechanisms were at all different in their mechanical structures, one would function ahead of the other. In operating landing gears, where simultaneous and uniform operation is essential the heretofore described metering device was developed for effecting such operation regardless of mechanical difference in the mechanisms. When the fluid is introduced into the inlet opening 59 it passes into the chamber 58 and due to the clearances between the cylinders and their respective bores, the fluid flows into the inner ends of the bores filling the same. The inner ends of the bores are also in communication by the connecting passageway 16 and thus a dampening effect is provided for the cylinders in the event they should operate with any great amount of oscillation, or should be caused to vibrate from impulses imparted from the pump or otherwise.

In the operation of the metering device the inlet opening 59 is suitably connected with a source of fluid under high pressure, usually a hydraulic pump from which the fluid is discharged under varying pressures, and the outlet openings 19 and 20 connected respectively with a pair of mechanisms whose simultaneous and uniform operation is desired. As the fluid under pressure enters the chamber 53 in the cover member 51, it is forced to flow with high velocity through each of the long relatively small diameter passageways 40 and 41 in the respective cylinders 23 and 24. At the end of each passageway the fluid engages the adjacent yieldable valve members 44 and 45 moving them inwardly against the tension of the springs 46 and 47 sufficiently to establish communication with the adjacent transverse openings 50 and 51. Inasmuch as the transverse openings 50 and 51 are in communication with the adjacent annular passageways 21 and 22 respectively the fluid from the passageways 40 and 41 flows through both and outwardly from the adjacent communicating outlet openings 19 and 20 to the pair of fluid actuated mechanisms whose simultaneous and uniform operation is desired. Now if one of the fluid actuated mechanisms is structurally different from the other, no matter how slight, they will require different operating pressures and to insure simultaneous and uniform operation relatively different volumes of fluid are transmitted to the respective mechanisms. This is effected by having the cylinders operate in unison in relatively opposite directions, the cylinders, controlling the flow of fluid to the mechanism requiring the lesser pressure to operate, moving in a direction to restrict the flow of fluid from its cooperating discharge opening while the other cylinder is moved in an opposite direction to increase the flow of fluid from its cooperative discharge opening. By the pivotal link connection the cylinders move relatively a predetermined distance and by use of the adjusting member 34 the relationship between the transverse openings and adjacent annular passageways may be predeterminately effected. If, on the other hand, the operating pressures required are identical the relative positions of the cylinders and valve members are such as to permit equal volumes of fluid to be discharged from each outlet openings 19 and 20. The use of the valve members 44 and 45 affords effective operation even where the relative differences in operating pressures is trivial.

Figure 4:
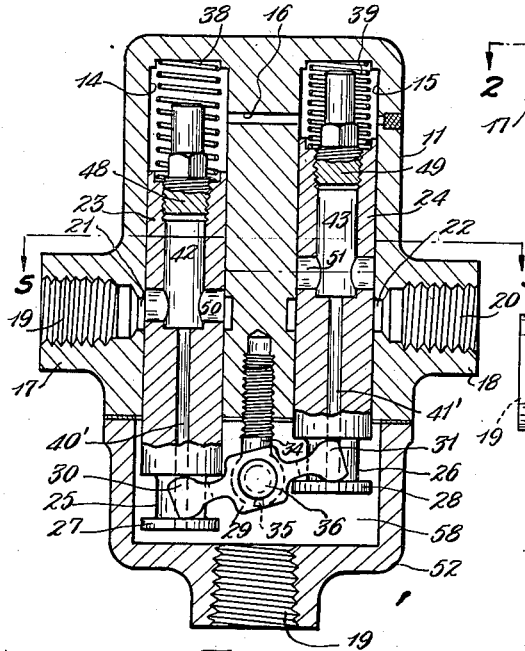
Figure 4 is a longitudinal vertical sectional view similar to that shown in Figure 2 but illustrating a modified construction embodying the invention.
Figure 5:
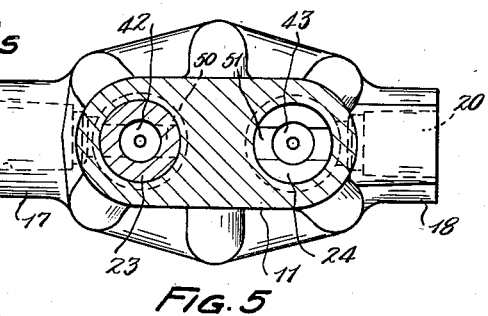
Figure 5 is a transverse sectional view taken along line 5—5 in Figure 4 and showing details of the modified form.

In Figures 4 and 5 I have illustrated a modified construction embodying the invention but in which the valve members 44 and 45 shown in the other figures have been eliminated. In this case the passageways 40' and 41' in the cylinders 23 and 24 are of relatively small diameters and extend inwardly from the outer ends of the cylinders. The inner ends of the passageways 40' and 41' communicate with the inner ends of the openings 42 and 43 of relatively larger diameter and the transverse openings 50 and 51 are in communication with the openings 42 and 43. The transverse openings 50 and 51 communicate with the adjacent annular passageways 21 and 22 which latter communicate with their respective outlet openings 19 and 20. Here again the relative positions of the transverse openings 50 and 51 and their respective annular passageways are predetermined by suitable adjustment of the adjustable member 34 to adapt the device for different conditions. The passageways 40' and 41' can be made of different diameters thus varying the amounts of restriction sufficient to properly operate the cylinders. As shown in Figure 4 the cylinder 24 would never assume the position shown in operation, for at no time is a complete shutoff possible, as the nearly closing of one transverse opening in its respective cylinder opens the other a corresponding amount and thus permits discharge of fluid in direct proportion from each outlet opening.

While I have described the preferred embodiment of the invention it is to be understood that I am not to be limited thereto inasmuch as changes and modifications may be resorted to without departing from the spirit of the invention as defined in the appended claims.

What is claimed is:

1. A fluid metering device comprising a housing having a fluid inlet opening and a pair of fluid outlet openings, said housing being formed with a pair of relatively spaced bores in common communication with said inlet opening, each of said bores having a fluid outlet port affording communication with different outlet openings; a pair of pistons slidably mounted in said bores and each provided with a longitudinally extending passageway of relatively small diameter in common communication at their outer ends with said inlet opening, each passageway at its inner end communicating with a laterally extending port in operative alignment with the adjacent outlet port thus affording communication with the respective outlet opening; resilient means operatively associated with each piston for exerting a yieldable pressure thereon and effecting an initial balancing of said pistons; and means operatively connecting said pistons for unitary movement in relatively different directions to vary in opposed relation the relative positions of adjacent ports; said pistons being movable by a difference in the relative velocities of the fluid passing through their respective passageways whereby the volume of fluid discharged from each outlet opening will be in definite proportion with one another.

2. A fluid metering device comprising a housing having a fluid inlet opening and a pair of fluid outlet openings, said housing being formed with a pair of relatively spaced bores in common communication with said inlet opening, each of said bores having a fluid outlet port affording communication with different outlet openings; a pair of pistons slidably mounted in said bores and each provided with a longitudinally extending passageway of relatively small diameter in common communication at their outer ends with said inlet opening, each passageway at its inner end communicating with a laterally extending port in operative alignment with the adjacent outlet port thus affording communication with the respective outlet opening; and means operatively connecting said pistons for unitary movement in relatively different directions to vary in opposed relation the relative positions of adjacent ports; said pistons being movable by a difference in the relative velocities of the fluid passing through their respective passageways whereby the volume of fluid discharged from each outlet opening will be in definite proportion with one another; said housing being provided with a communicating passageway connecting the inner ends of said bores for effectively cushioning the movement of said pistons.

3. A fluid metering device comprising a housing having a fluid inlet opening and a pair of fluid outlet openings, said housing being formed with a pair of relatively spaced bores in common communication with said inlet opening, each of said bores having a fluid outlet port affording communication with different outlet openings; a pair of pistons slidably mounted in said bores and each provided with a longitudinally extending passageway of relatively small diameter in common communication at their outer ends with said inlet opening, each passageway at its inner end communicating with a laterally extending port in operative alignment with the adjacent outlet port thus affording communication with the respective outlet opening; means operatively connecting said pistons for unitary movement in relatively different directions to vary in opposed relation the relative positions of adjacent ports; and adjustable means operatively connected to said piston connecting means for moving said pistons bodily to thereby initially vary the relative positions of the outlet ports; said pistons being movable by a difference in the relative velocities of the fluid passing through their respective passageways whereby the volume of fluid discharged from each outlet opening will be in definite proportion with one another.

4. A fluid metering device comprising a housing having a fluid inlet opening and a pair of fluid outlet openings, said housing being formed with a pair of relatively spaced bores in common communication with said inlet opening, each of said bores having a fluid outlet port affording communication with different outlet openings; a pair of pistons slidably mounted in said bores and each provided with a longitudinally extending passageway of relatively small diameter in common communication at their outer ends with said inlet opening, each passageway at its inner end communicating with a second passageway of greater diameter to provide a valve seat, the inner end of said second passageway communicating with a laterally extending port in operative alignment with the adjacent outlet port thus affording communication with the respective outlet opening; a valve member slidably mounted in each of said second passageways and operatively associated with the adjacent seat for effecting a yieldable resistance to the flow of fluid thereby; resilient means operatively associated with each valve member for exerting a pressure thereon; and means operatively connecting said pistons for unitary movement in relatively different directions to vary in opposed relation the relative positions of adjacent ports; said pistons being movable by a difference in the relative velocities of the fluid passing through their respective passageways of relatively small diameter whereby the volume of fluid discharged from each outlet opening will be in definite proportion with one another.

5. A fluid metering device comprising a housing having a fluid inlet opening and a pair of fluid outlet openings, said housing being formed with a pair of relatively spaced bores in common communication with said inlet opening, each of said bores having a fluid outlet port affording communication with different outlet openings; a pair of pistons slidably mounted in said bores and each provided with a longitudinally extending passageway of relatively small diameter in common communication at their outer ends with said inlet opening, each passageway at its inner end communicating with a second passageway of greater diameter to provide a valve seat, the inner end of said second passageway communicating with a lateral extending port in operative alignment with the adjacent outlet port thus affording communication with the respective outlet opening; resilient means operatively associated with each piston for exerting a yieldable pressure thereon and effecting an initial balancing of said pistons; a valve member slidably mounted in each of said second passageways and operatively associated with the adjacent seat for effecting a yieldable resistance to the flow of fluid thereby; resilient means operatively associated with each valve member for exerting a pressure thereon; and means operatively connecting said pistons for unitary movement in relatively different directions to vary in opposed relation the relative positions of adjacent ports; said pistons being movable by a difference in the relative velocities of the fluid passing through their respective passageways of relatively small diameter whereby the volume of fluid discharged from each outlet opening will be in definite proportion with one another.

6. A fluid metering device comprising a housing having a fluid inlet opening and a pair of fluid outlet openings, said housing being formed with a pair of bores disposed in substantially parallel spaced relation and in common communication with said inlet opening, each of said bores having a fluid outlet port affording communication with different outlet openings; a pair of pistons slidably mounted in said bores and each provided with a longitudinally extending passageway of relatively small diameter in common communication at their outer ends with said fluid inlet opening, each passageway at its inner end communicating with a laterally extending port in operative alignment with the adjacent outlet port thus affording communication with the respective fluid outlet opening; means operatively connecting said pistons for unitary movement in relatively opposite directions to vary in opposed relation the relative positions of adjacent ports; and resilient means operatively associated with each piston for exerting a yieldable pressure thereon and effecting an initial balancing of said pistons; said pistons being movable by a difference in the relative velocities of the fluid passing through their respective passageways whereby the volume of fluid discharged from each outlet opening will be in definite proportion with one another.

7. A fluid metering device comprising a housing having a fluid inlet opening and a pair of fluid outlet openings, said housing being formed with a pair of bores disposed in substantially parallel spaced relation and in common communication with said inlet opening, each of said bores having a fluid outlet port affording communication with different outlet openings; a pair of pistons slidably mounted in said bores and each provided with a longitudinally extending passageway of relatively small diameter in common communication at their outer ends with said fluid inlet opening, each passageway at its inner end communicating with a laterally extending port in operative alignment with the adjacent outlet port thus affording communication with the respective fluid outlet opening; a link member pivotally mounted in said housing and having laterally projecting ends operatively associated with said pistons for effecting unitary movement of the latter in relatively opposite directions to vary in opposed relation the relative positions of adjacent ports; said pistons being movable by a difference in the relative velocities of the fluid passing through their respective passageways whereby the volume of fluid discharge from each outlet opening will be in definite proportion with one another.

8. A fluid metering device comprising a housing having a fluid inlet opening and a pair of fluid outlet openings, said housing being formed with a pair of bores disposed in substantially parallel spaced relation and in common communication with said inlet opening, each of said bores having a fluid outlet port affording communication with different outlet openings; a pair of pistons slidably mounted in said bores and each provided with a longitudinally extending passageway of relatively small diameter in common communication at their outer ends with said fluid inlet opening, each passageway at its inner end communicating with a laterally extending port in operative alignment with the adjacent outlet port thus affording communication with the respective fluid outlet opening; a link member pivotally mounted in said housing and having laterally projecting ends operatively associated with said pistons for effecting unitary movement of the latter in relatively opposite directions to vary in opposed relation the relative positions of adjacent ports; and adjustable means operatively connected to said link member for moving said pistons bodily to thereby initially vary the relative positions of the outlet ports; said pistons being movable by a difference in the relative velocities of the fluid passing through their respective passageways whereby the volume of fluid discharged from each outlet opening will be in definite proportion with one another.

9. A fluid metering device comprising a housing having a fluid inlet opening and a pair of fluid outlet openings, said housing being formed with a pair of bores disposed in substantially parallel spaced relation and in common communication with said inlet opening, each of said bores having a fluid outlet port affording communication with different outlet openings; a pair of pistons slidably mounted in said bores and each provided with a longitudinally extending passageway of relatively small diameter in common communication at their outer ends with said fluid inlet opening, each passageway at its inner end communicating with a laterally extending port in operative alignment with the adjacent outlet port thus affording communication with the respective fluid outlet opening; a link member pivotally mounted in said housing and having laterally projecting ends operatively associated with said pistons for effecting unitary movement of the latter in relatively opposite directions to vary in opposed relation the relative positions of adjacent ports; said pistons being movable by a difference in the relative velocities of the fluid passing through their respective passageways whereby the volume of fluid discharged from each outlet opening will be in definite proportion with one another; said housing being provided with a communicating passageway connecting the inner ends of said bores for effectively cushioning the movement of said pistons.

10. A fluid metering device comprising a housing having a fluid inlet opening and a pair of fluid outlet openings, said housing being formed with a pair of bores disposed in substantially parallel spaced relation and in common communication with said inlet opening, each of said bores having a fluid outlet port affording communication with different outlet openings; a pair of pistons slidably mounted in said bores and each provided with a longitudinally extending passageway of relatively small diameter in common communication at their outer ends with said fluid inlet opening, each passageway at its inner end communicating with a laterally extending port in operative alignment with the adjacent outlet port thus affording communication with the respective fluid outlet opening; a link member pivotally mounted in said housing and having laterally projecting ends operatively associated with said pistons for effecting unitary movement of the latter in relatively opposite directions to vary in opposed relation the relative positions of adjacent ports; and resilient means operatively associated with each piston for exerting a yieldable pressure thereon and effecting an initial balancing of said pistons; said pistons being movable by a difference in the relative velocities of the fluid passing through their respective passageways whereby the volume of fluid discharged from each outlet opening will be in definite proportion with one another.

11. A fluid metering device comprising a housing having a fluid inlet opening and a pair of fluid outlet openings, said housing being formed with a pair of bores disposed in substantially parallel spaced relation and in common communication with said inlet opening, each of said bores having a fluid outlet port affording communication with different outlet openings; a pair of pistons slidably mounted in said bores and each provided with a longitudinally extending passageway of relatively small diameter in common communication at their outer ends with said fluid inlet opening, each passageway at its inner end communicating with a laterally extending port in operative alignment with the adjacent outlet port thus affording communication with the respective fluid outlet opening; a link member pivotally mounted in said housing and having laterally projecting ends operatively associated with said pistons for effecting unitary movement of the latter in relatively opposite directions to vary in opposed relation the relative positions of adjacent ports; and resilient means operatively associated with each piston for exerting a yieldable pressure thereon and effecting an initial balancing of said pistons; said pistons being movable by a difference in the relative velocities of the fluid passing through their respective passageways whereby the volume of fluid discharged from each outlet opening will be in definite proportion with one another; said housing being provided with a communicating passageway connecting the inner ends of said bores for effectively cushioning the movement of said pistons.

JAMES P. JOHNSON.